Nov. 12, 1968     I. GINSBURGH ET AL     3,410,320

MEASURING AND FILLING APPARATUS

Filed March 19, 1965     3 Sheets-Sheet 1

INVENTORS.
Irwin Ginsburgh
Lawrence T. Wright

BY *William T. McClain*

ATTORNEY

INVENTORS.
Irwin Ginsburgh
Lawrence T. Wright

BY William T. McClain
ATTORNEY

United States Patent Office 3,410,320
Patented Nov. 12, 1968

3,410,320
MEASURING AND FILLING APPARATUS
Irwin Ginsburgh, Morton Grove, and Lawrence T. Wright, Homewood, Ill., assignors to Standard Oil Company, Chicago, Ill., a corporation of Indiana
Filed Mar. 19, 1965, Ser. No. 441,269
6 Claims. (Cl. 141—98)

ABSTRACT OF THE DISCLOSURE

Apparatus for determining the distance from a datum plane to an object, including an extendable probe, a pressure sensitive switch on the extended end, a probe drive means having a control means, and a transducer sensitive to the movements of the probe to produce representative signals along the path of the probe.

---

Figure 1:
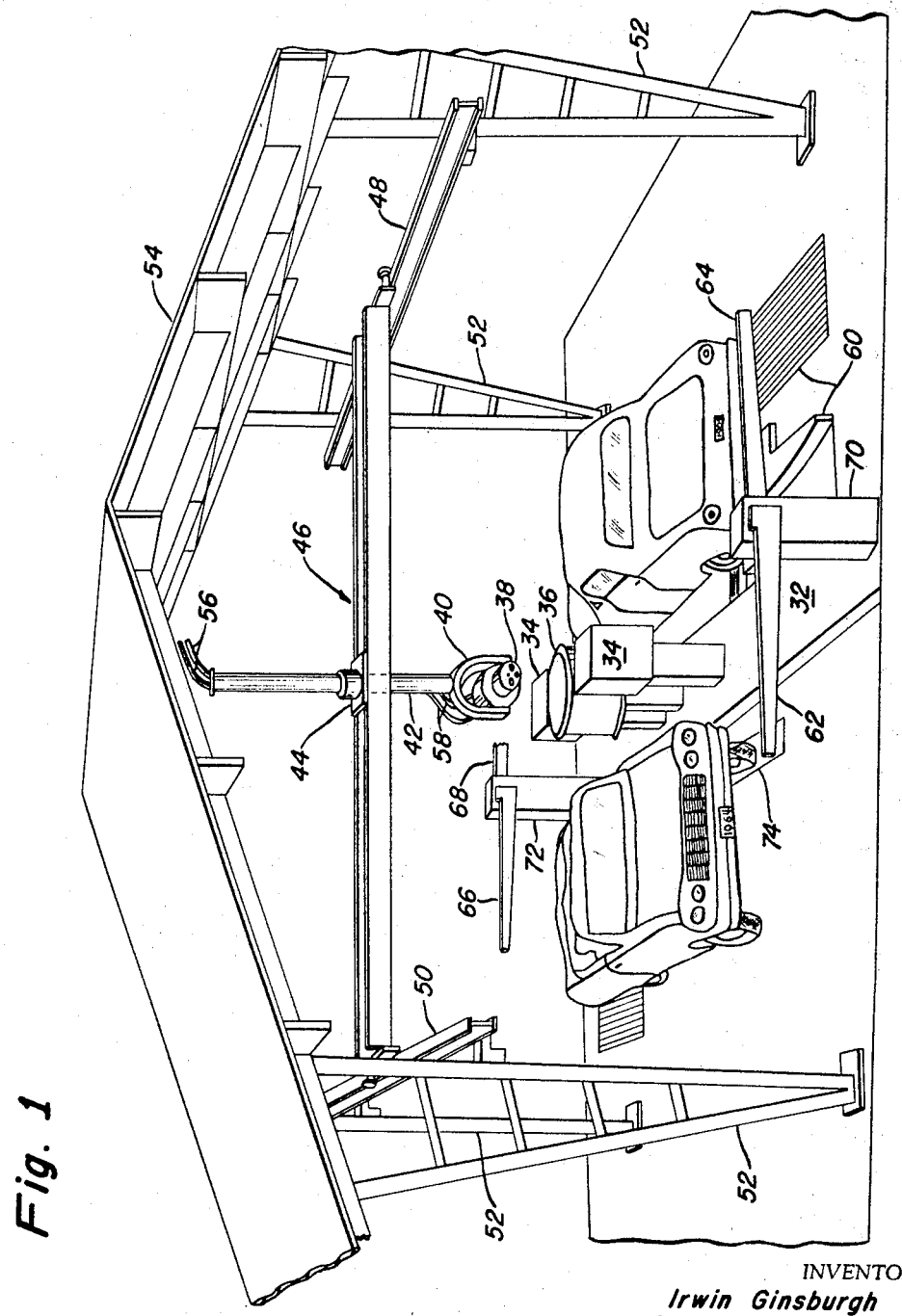

This invention relates to apparatus for determining the distance between a reference point and an object, and, more particularly, it concerns apparatus for measuring the vertical distance between a datum plane and a vertically traveling object. Still more particularly, the invention is concerned with apparatus for measuring the vertical distance between a datum plane and a reference point on an automotive vehicle being fueled by automatic fuel dispensing apparatus.

In an application for United States Letters Patent Ser. No. 410,913, filed Nov. 13, 1964, by I. Ginsburgh, there is disclosed a system for automatically fueling automotive vehicles. The aforementioned application discloses an automatically controlled fueling system for automotive vehicles, such as conventional automobiles, which includes: dispensing means including a dispensing head for transferring fuel from bulk storage to a fuel tank in such vehicles; means for locating a vehicle to be fueled in reference to the dispensing means or some predetermineable neutral control point; means for guiding the dispensing head to an inlet in the vehicle's fuel tank; means for engaging a discharge nozzle in the dispensing head with the fuel inlet; means for controllably flowing fuel through the nozzle into the tank; means for disengaging the dispensing head from the fuel inlet; numerical control means inclusive of a stored program of guidance control information based on the location of fuel tank inlets in such automotive vehicles relative to any predetermined control point of the fueling system and means associated with the stored program for selectively actuating and automatically controlling the guidance and operational movements of the dispensing head as well as the nozzle and other elements associated with the dispensing head and with fuel control; and means for selectively initiating the operation of the numerical control means and the flow of fuel through the dispensing system. Advantageously, the last-stated means comprises identification-selector means which is adapted to transmit a signal identifying the vehicle to be fueled with respect to make and model and to provide means for selecting the quantity and grade of fuel to be dispensed by the system.

Broadly speaking, the present invention provides apparatus for determining the distance from a datum plane to an object, for example, a selected point on an automobile to be fueled. The apparatus comprises a probe member extendible from the datum plane to contact the object, a contact surface on one end of the probe and a pressure sensitive switch means on the contact surface. A drive means is operatively connected to the probe for extending and retracting the probe and to place the contact surface of the probe in contact with the object. A control means is connected to the drive means and the switch means to control the operation of the drive means. A transducer sensitive to movements of the probe along its path is operatively connected to the probe to produce a signal representative of the distance the probe is extended from the datum plane. As described hereinbelow, the vertically traveling elevator carrying the dispensing head is operatively connected to the transducer and responsive to a signal therefrom so as to move toward and away from the location of the object. Preferably, the apparatus further includes a second transducer operatively connected to the elevator to provide a signal representative of the distance from the elevator to the datum plane, and there is provided a signal generator for supplying a constant intensity signal in response to instructions from a stored program. The output signals from the transducers and the signal generator are transmitted to a transformer which provides an output signal representative of the sum of the probe transducer signal and the constant intensity signal versus the elevator transducer signal.

The above-mentioned application discloses apparatus as shown in FIGURE 1, which is an isometric schematic view of a refueling station equipped with the automatic dispensing equipment mentioned above. FIGURE 1 shows two automobiles in position for refueling on each side of an island 32 (as that term is used in the gasoline retailing business) upon which is disposed two typical gasoline pump stands 34. In between the pumps is a console 36 which bears a number of buttons or switches through which the driver of the automobile exchanges with the apparatus information regarding the identification of the automobile in terms of its model year, manufacturer, model and body style, and the type and amount of fuel desired.

Above console 36 is dispensing head 38, rotatable on trunnions (not shown) and suspended in yoke 40 from vertical elevator 42. Elevator 42 is carried by, and extends above, carriage 44 which is supported by and traverses along bridge 46, which in turn is supported by and traverses along crane rails 48 and 50. Posts 52 support the crane rails and also support optional roof 54. Two fuel hoses 56 are shown entering the top of elevator 42 and lead into the elevator from fuel pumping means not shown, which draws fuel from a fuel storage tank, also not shown. Flexible hoses 58 lead from the base of elevator 42 into the rear end of dispensing head 38.

Dispensing head 38 carries flap-opening means, gas cap-removal means and nozzle projection means, which are merely schematically illustrated in FIGURE 1 by the small circles on the face of dispensing head 38. When dispensing head 38 is centered above island 32 as shown in FIGURE 1, it is in its neutral position with respect to each automobile.

Lateral and longitudinal vehicle positioning means 60 are constructed into the grade surface of the refueling station. A pressure sensing plate 74 detects that the automobile has advanced until the left front wheel rests on the plate.

Barrier gates 62, 64, 66 and 68 are mounted on barrier posts 70 and 72, respectively, at each end of island 32, and function to direct automobiles to the proper side of island 32. Gates 64 and 66 normally are open when no automobiles are being serviced, but close after an automobile drives in to be serviced. Gates 64 and 66 keep the automobile next in line for service from moving in close so that there is sufficient clearance for dispensing head 38 to operate properly. Gates 62 and 68 are raised when the servicing operation is complete.

Because of the automatic character of the process and device, the diversity, in terms of model year, manufacturer, model and body style, of the atuomobiles currently used by the motoring public, and the diversity of locations on such automobiles of the fuel tank inlet, it is necessary to locate each automobile with respect to the over-all apparatus prior to starting the refueling operation. The position of the automobile with respect to the apparatus may be approximate, being merely with a certain range of lateral and longitudinal distances from reference points, or it may be fairly precise, to a tolerance of about plus or minus ¼ inch in each direction measured from appropriate reference positions on a car. If the automobile positioning is only approximate, it is necessary to provide the apparatus with means to measure for each individual vehicle to be refueled the distance from fixed reference points to the vehicle, and to design the dispenser head positioning means to compensate for the variations in such distances. Because of the added complexity necessarily required of the apparatus when the vehicle positioning means is designed for only approximate accuracy, we consider it advantageous to design such means to position the vehicle with greater precision, illustratively to a tolerance of plus or minus ¼ inch laterally and longitudinally. One specific system for so doing is covered in co-pending application Ser. No. 441,248, filed Mar. 19, 1965, by I. Ginsburgh, E. Runes, H. J. Nebelsiek and R. A. Sholts.

The dispensing head, which carries one or more fuel nozzles, is positioned adjacent the fuel tank inlet by guidance means responsive through the numerical control system to the automobile identification means. The guidance means comprises electrically, hydraulically or pneumatically operated prime movers which move the dispensing head laterally, longitudinally, vertically and angularly from its neutral position (to which it is returned after each refueling operation) to the fuel tank inlet. Electrical motors are preferred prime movers, because of the pecision with which their movements and the movements of the mechanical elements driven by them may be measured and controlled. Chain and sprocket, various types of gears, and rack and pinion means are advantageously used as the mechanical linkage elements because of the minimal slippage in their movements. The dispensing head positioning means also comprises a continuously operating variable vertical positioning means hereinafter described.

From a known neutral position of the dispensing head and the known position of the reference planes of an automobile (e.g., a vertical plane through the rear axle and a vertical plane through the center of the left rear tire and perpendicular to the rear axle—the intersection of such planes forming a plumb line), the lateral and longitudinal distances through which the dispensing head must move to position it adjacent the fuel tank inlet are readily calculable for each model of automobile. This is because, for each such model, the lateral and longitudinal distances from the reference planes to the fuel tank inlet and to the dispensing head's neutral position are fixed distances.

However, the net vertical distance from the neutral position through which the dispensing head must move is the difference between the known and constant vertical elevation of the dispensing head in its neutral position above a datum plane, such as the grade level of the service station, and the variable vertical distance between the fuel tank inlet and such datum plane. The latter distance not only differs from one model of vehicle to another, but varies within each model because of varying loads carried by the vehicle, and such things as the condition of its suspension system and the extent of inflation of its tires. Furthermore, such distance is subject to continuous variation during refueling as a result of changes in the load carried by the automobile, such as by passengers shifting position, and as a result of the addition of the fuel itself.

Accordingly, as described hereinbelow, it is necessary to measure continuously such variable vertical distance. This may be done by measuring with a vertically extendible probe, which is an element in the variable vertical position determining means, the distance from the datum plane to a preselected location on the vehicle, advantageously on the underside of the vehicle. Such location desirably has an essentially horizontal surface. Because there does not appear to be any single location on the underside of all automobiles which is suitable, it may be necessary to have a plurality of extendible probes, or a single movable probe which can be positioned for each refueling operation in response to the identification of the automobile, and then extended to measure the vertical distance. A single fixed probe may be used if it carries on its upper end a flat detecting member of relatively large surface area, on the order of 8 inches by 12 inches, disposed in a horizontal plane and substantially rigidly affixed to the probe. The size of such area may vary, depending upon the underside configuration of the various models of automobiles to be serviced.

In operation, the probe is extended upwardly, in response to an instruction, until its detecting member stops against an obstruction on the underside of the automobile. For each automobile, the relative location of the obstruction and the vertical distance from such obstruction to the fuel tank inlet will be determinable and constant. Hence, this latter vertical distance plus the distance the probe extends above the datum plane totals the vertical distance from such plane to the vertical tank inlet and is subtracted from the elevation of the dispensing head in its neutral position to determine the net vertical movement of the dispensing head necessary to bring it adjacent the fuel tank inlet. Unlike the dispensing head's longitudinal and lateral positioning means, the circuits for the variable vertical positioning means and other components of the dispensing head's vertical positioning means are continuously operating during the refueling operation, and the elevation of the dispensing head is responsively and continuously adjusted. The measurement of the distance through which the variable vertical positioning probe is extended may be performed by using linear variable differential transformers acting as transducers. The various vertical distance measurements are summed algebraically to hold the dispensing head vertically adjacent the fuel tank inlet. Alternatively, such measurement may be done by pneumatic means, in which event it is desirabe that the elevator's vertical prime moving means also be pneumatic.

The movement of the dispensing head need not be done solely by straight line movement, but may be so controlled by concurrent operation of a plurality of the elements comprising the dispenser head positioning means so as to trace a curve in space. The accuracy of positioning the dispensing head need only be about plus or minus ¼ inch along each axis. However, it is desirable that the movements of the dispensing head be known and ascertainable without slippage. Accordingly, motors are preferred prime movers relative to hydraulic or pneumatic means, and mechanical elements having fixed relationships, such as racks and pinions, gears, or sprocket chains are desirable mechanical linkages.

Particular embodiments of the apparatus of the present invention are set out in the annexed figures which form a part of this specification.

FIGURE 1 (previously described) is an isometric schematic overall view of a refueling station equipped with the automatic dispensing equipment described herein.

Figure 2:
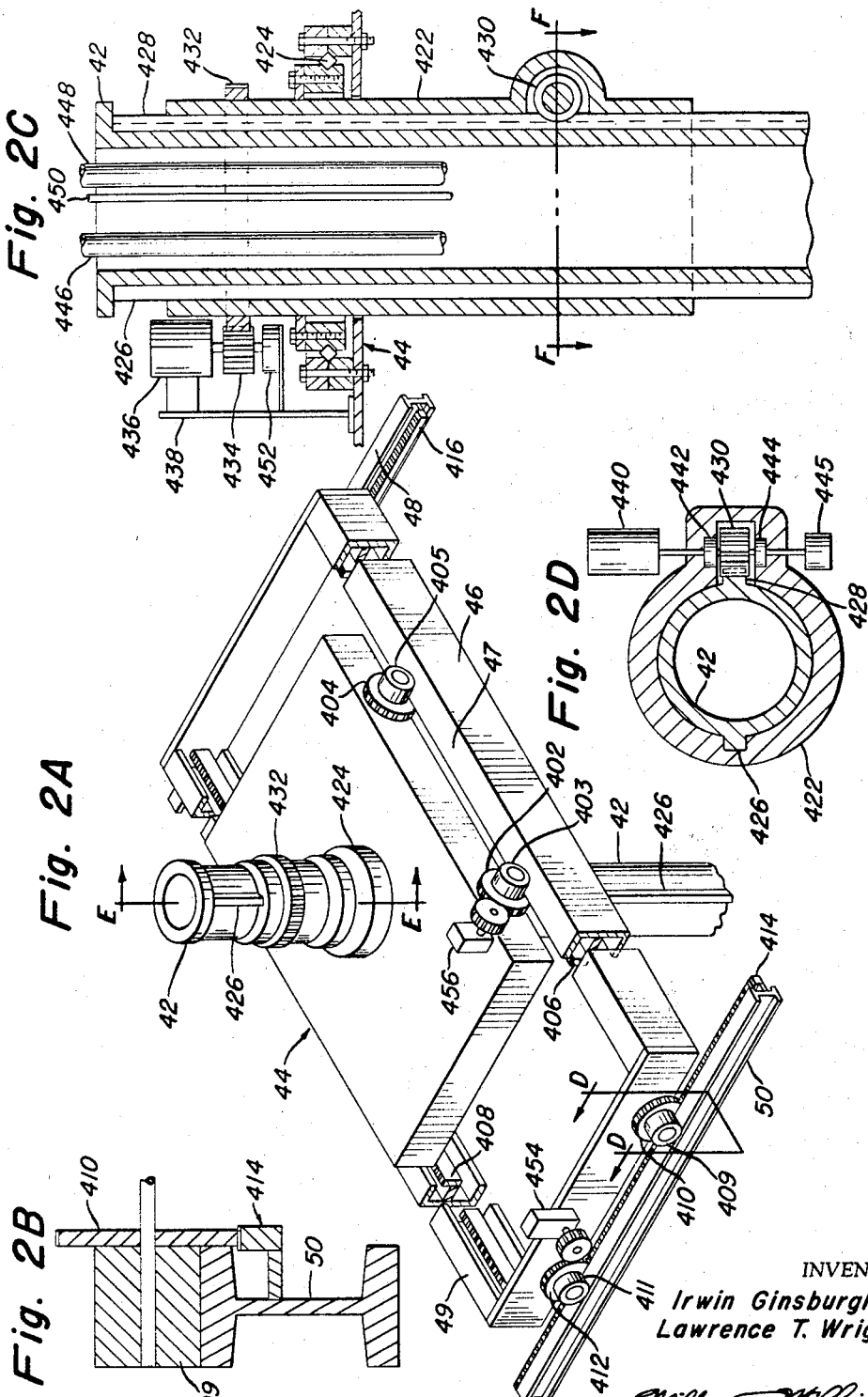

FIGURE 2A is an isometric schematic view of the crane rails, bridge, carriage and the top of the elevator. FIGURE 2B is a schematic vertical sectional view of section D—D of FIGURE 2A. FIGURE 2C is a vertical sectional view of section E—E of FIGURE 2A. FIGURE 2D is a partial sectional view of section F—F of FIGURE 2C.

Figure 3:
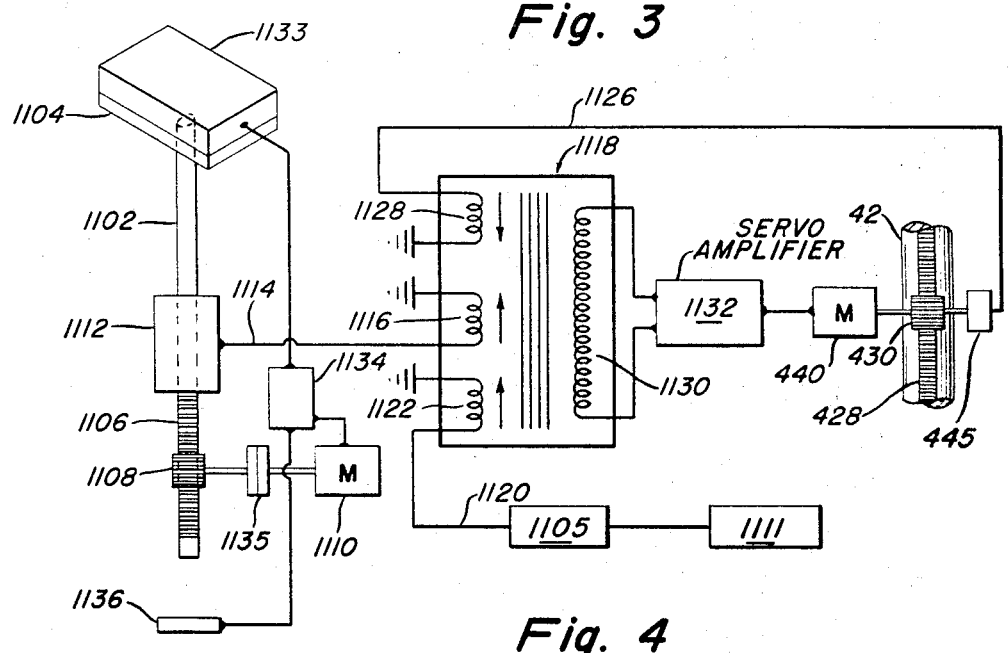

FIGURE 3 is a schematic diagram of the mechanical elements and circuitry of the variable vertical position determining means.

Figure 4:
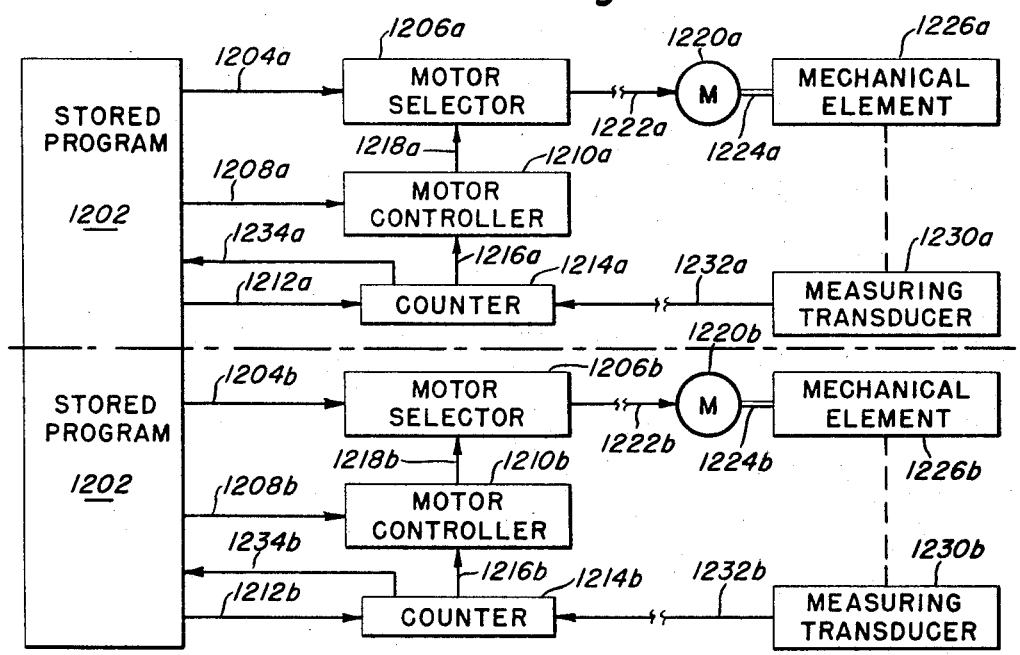

FIGURE 4 symbolically illustrates the logic circuitry of the numerical control system utilized in operating the automatic fuel dispensing system.

Throughout the figures, means for fastening (by screws, bolts, welds, etc.) together the various elements have been omitted for the sake of clarity and ease of understanding. Also, bearings have generally not been numbered, and in some instances not shown, their need and location being within the scope of established mechanical engineering skill.

FIGURE 1 has previously been described and need not be further described. The crane and elevator mechanism for moving the dispensing head are shown in FIGURE 2A, which illustrates in greater detail and in an isometric view bridge 46, crane rails 48 and 50, carriage 44, and the top part of elevator 42. Elevator 42 is rotatably carried by carriage 44. The carriage is equipped with pinion wheels 402 and 404 which engage driving rack 406 affixed to one cross member of bridge 46. The weight of carriage 44 is borne by support wheels bearing on bridge 46 as illustrated by support wheels 403 and 405 and bridge rail 47. Carriage 44 is driven back and forth across the bridge by a positioning motor (not shown) responsive to transverse transducer 456. Such positioning motor is connected by a positive drive mechanism to the axle of wheels 402 and 403. Carriage 44 is further supported and moved on bridge 46 by support and pinion wheels (not shown) mounted on the axles of wheels 402 and 404, and which engage rail 49 and driving rack 408 of the bridge.

Bridge 46 traverses along crane rails 48 and 50 supported by bridge support wheels 409 and 411 and driven by pinion wheels 410 and 412 which engage driving rack 414 mounted on crane rail 50. Similar support wheels and pinion wheels (not shown) engage rail 48 and guide rack 416. Bridge 46 is driven along the crane by means of a positioning motor (not shown) which is responsive to longitudinal transducer 454 and which engages through a positive drive mechanism the axle of pinion wheel 410. Other mechanisms for moving the carriage and the bridge could be used such as a linear electric motor, screw and nut mechanism, hydraulic and pneumatic cylinders.

Before completing the description of FIGURE 2A, attention is directed to FIGURE 2B which is a schematic vertical sectional view of section D—D of FIGURE 2A and which shows the engagement pinion wheel 410 with rack 414 and support wheel 409 of crane rail 50. Pinion wheels 402, 404, 410, 412 and their counterparts (not shown) disposed at the end of their axles are all constructed the same; likewise, support wheels 403, 405, 409 and 411 may all be constructed the same. Similarly, bridge racks 406 and 408 and crane rail racks 414 and 416 may be constructed the same.

Elevator 42 is rotatably supported by carriage 44. The explanation of the rotation, and the raising and lowering, of the elevator 42 is most easily done in connection with FIGURE 2C, which is a vertical sectional view of section E—E of FIGURE 2A. Carriage 44 supports turntable 422 through X-bearing 424. The inner and outer races of X-bearing 424 are affixed, respectively, to turntable 422 and carriage 44. Elevator 42 is concentrically mounted within turntable 422 and is maintained in fixed rotational and vertical alignment therewith by key 426. Opposite key 426 is a rack 428 mounted on elevator 42 which engages the teeth of pinion 430 mounted on turntable 422.

Ring gear 432 mounted on turntable 422 engages pinion 434 driven by rotation motor 436 (shown in FIGURE 2C but not in FIGURE 2A) which is mounted on motor support 438 on carriage 44. Rotation transducer 452, which is directly connected to pinion 434, controls rotation of motor 436.

FIGURE 2C also depicts fuel conduits 446 and 448 (to which lead hoses 56 of FIGURE 1) and power conduit 450 disposed within elevator 42. For simplicity, these conduits are not shown in FIGURE 2A or FIGURE 2D.

FIGURE 2D is a partial horizontal view of section F—F of FIGURE 2C. It shows elevator 42, turntable 422, key 426, rack 428, pinion 430, and vertical transducer 445. Pinion 430 is driven by dispensing head vertical positioning motor 440 and is supported within turntable 422 by bearings 442 and 444. Vertical transducer 445 is connected to pinion 430; the function of transducer 445 is described hereinafter.

In operation, elevator 42 is rotated by motor 436 turning pinion 434 which, through its engagement with gear ring 432 on turntable 422 and key 426, causes elevator 42 to rotate with respect to carriage 44. Elevator 42 is moved vertically as a result of vertical positioning motor 440 turning pinion 430 which engages rack 428 of the elevator, thereby causing the latter to move upward or downward depending upon the direction of rotation of pinion 430. Key 426 acts as a guide to maintain proper alignment.

As noted above, a variable vertical vehicle position determining means is required because the vertical distance above grade of the fuel tank inlet varies from automobile to automobile, even though they may be identical models. The variation in such distance results from variations in the condition of the vehicle's tires and rear springs and the loads (passengers, luggage and fuel) on the tires and springs. Because the addition of the fuel alone will alter such distance during the refueling operation, it is necessary, as previously described, to provide for initially sensing the elevation of each vehicle above a known datum plane, in order that the dispensing head be correctly positioned initially relative to the mouth of the fuel tank inlet, and further to provide means for continuously sensing such elevation during the refueling operation, and adjusting the vertical position of the dispensing head in response thereto.

The electrical circuitry and the primary mechanical elements comprising the variable vertical position determining means are shown schematically in FIGURE 3. Variable vertical position determining probe 1102 carries a horizontal support plate 1104 (shown isometrically), also shown on FIGURE 2, with a pressure sensitive switch 1133 on its upper surface. Pressure sensitive switch 1133 detects the pressure of any contact made on its upper surface. In operation, plate 1104 and switch 1133 are raised by rack 1106 until switch 1133 contacts some point on the underside of the automobile. Rack 1106 is driven through pinion 1108 by vertical probe motor 1110. Contact of switch 1133 with the underside of the automobile signals motor control relay 1134 to stop motor 1110. Friction clutch 1135 allows probe 1102 to descend as the automobile descends with any increase in its load. Variable vertical position determining probe transducer 1112 (which preferably is a commercially available linear variable differential transformer acting as a transducer) is disposed around probe 1102 and adapted to continuously electrically signal (alternating current) the distance such probe is extended upwardly from a datum plane. Such signal is transmitted through line 1114 to first primary winding 1116 of transformer 1118.

The vertical distance between the mouth of the fuel tank inlet and the obstructing point on the underside of the vehicle (which point is sensed by probe 1102) is constant for each model of vehicle, and is represented by a constant intensity electrical signal generated by conventional signal generator 1105 upon instruction by the stored program 1111 for such model and transmitted through line 1120 to second primary winding 1122.

Elevator-elevation measuring transducer 445 is disposed adjacent elevator 42 and is adapted to measure the vertical distance between the reference datum plane and the axis of the trunnions of yoke 40, and to transmit through line 1126 a signal proportioned to such distance. Transducer 445 preferably is a linear variable differential transformer, the core of which is mechanically coupled to pinion 430. Alternatively, it may be found desirable to employ various mechanical, photoelectric or magnetic devices to sense the movement of the elevator. Likewise, it may be advantageous to employ a shaft encoder to provide a digital signal for presentation to a computer employed in the numerical control means. The signal transmitted through line 1126 leads to third primary winding 1128.

(Elevator transducer 445 measures the distance to the trunnion axis, rather than to some point on dispensing head cover 502, because the dispensing head is rotatable about the trunnion axis, and, hence, the center of cover 502 may, and often will, be above or below such axis. To accommodate the latter event, the magnitude of the signal transmitted to primary winding 1122 is varied by the stored program as the dispensing head is so rotated, or is automatically varied by electromechanical means (not shown) in response to the dispensing head's rotation.)

Secondary winding 1130 of transformer 1118 leads to servo-amplifier 1132, which is continously actuated and which actuates dispensing head vertical positioning motor 440, which in turn drives pinion 430 engaged in rack 428 of elevator 42. The direction of rotation of motor 440 (and thus, the direction of vertical movement of elevator 42) depends upon the relative magnitude of the sum of the signals impressed upon first primary winding 1116 and second primary winding 1122, versus the signal impressed on third primary winding 1128. If the latter is greater than such sum, the axis of the trunnions is above the mouth of the fuel tank inlet; hence, the signal from secondary winding 1130 to servo-amplifier 1132 causes motor 440 to turn in a manner to lower the elevator 42, but if the latter is less than such sum, motor 440 is rotated in the opposite direction, thus raising elevator 42. When the signal to winding 1128 equals the sum of the signals to windings 1116 and 1122, and this is the desired condition, indicating as it does that the axis of the trunnions and, hence, the dispensing head is in the correct position, no signal is transmitted from secondary winding 1130, and motor 440 is not rotated.

After the completion of the refueling operation, motor 1110 lowers probe 1102 until it contacts limit switch 1136, which signals motor control relay 1134 to stop motor 1110, leaving probe 1102 in standby position.

Although the technique of using systems of stored programs and numerical control to operate machinery is known, it is believed appropriate to outline broadly and in conjunction with a schematic diagram the logic (as that word is used in the relevant art) of a numerical control system which may be used in operating the automatic refueling system described in this specification. FIGURE 4 symbolically illustrates the principle elements and circuitry of such logic. Two parallel arrangements are shown, one on each side of the horizontal dashed line, which provide the capability of concurrently operating two numerically controlled mechanical elements. For convenience and brevity of description, each parallel box and line on FIGURE 4 will bear the same numeral, but be differentiated by letter suffixes. The use of two such arrangements is optional; one suffices for operability, and more than two merely provide for the concurrent operation of an additional mechanical element for each additional parallel arrangement.

Stored program 1202 is electrically connected through line 1204a to motor selector 1206a; through line 1208a to motor controller 1210a; and through line 1212a to counter 1214a. Counter 1214a is connected through line 1216a to motor controller 1210a, which in turn is connected through line 1218a to motor selector 1206a. (The arrows on the electrical lines indicate the direction that the signal is being transmitted.)

Motor selector 1206a is connected to the desired motor 1120a for example, the rotation motor mentioned above, through line 1222a, the latter being shown broken, because the same motor selector will be connected sequentially through an appropriate switch (not shown) to various motors. Motor 1220a is mechanically linked through linkage 1224a (illustratively, a rack and pinion, worm gear, chain and sprocket, spline, etc.), to the mechanical element 1226a (illustratively, the turntable referred to above) driven by such motor.

The distance, linear or angular, through which mechanical element 1226a is moved is measured electromagnetically (as illustrated by the dashed line) by measuring transducer 1230a (for example, the rotation transducer mentioned above), which transmits its signal through line 1232a to counter 1214a. The counter in turn signals back to the stored program through line 1234a that the act instructed by the stored program has been executed, and that the logic system is ready for the next instruction.

The signal transmitted by the stored program over line 1204a determines the motor to be actuated; the signal transmitted over line 1208a determines the direction of rotation (clockwise or counterclockwise) of such motor; and the signal transmitted over line 1212a determines the angular distance such motor is to be rotated, which, of course, determines the distance, angular or linear, that its driven mechanical element 1226a is to move. The information signalled into motor controller 1210a is transmitted through line 1218a and motor selector 1206a to motor 1220a.

The signals transmitted by counter 1214a over line 1216a not only start and stop motor 1220a, but also slow it down, in response to the signal from measuring transducer 1230a transmitted over line 1232a indicating, when compared to the total desired distance signal received from the stored program over line 1212a that the desired movement of mechanical element 1226a is almost complete. This avoids undesirable overrun. Accordingly, counter 1214a desirably has preset capability and also warning capability.

Suitable counters, motor controllers and motor selectors may be electromechanical subassemblies which currently are commercially available.

Inasmuch as a plurality of clutches, all transmitting power from one motor, may be used to reduce the number of motors required the logic system depicted by FIGURE 4 may be expanded by innterposing a clutch, as part of mechanical linkage 1224, between motor 1220 and mechanical element 1226, such clutch to be designated by a clutch selector (not shown) operated by electromechanical means upon signal from stored program 1202.

From the foregoing description of particular embodiments of the present invention, various alternatives in the details of construction and operation, falling with the spirit and scope of the appended claims, may become apparent to the artisan.

We claim:
1. Apparatus for determining the distance from a datum plane to a selected location on a vehicle which is to be fueled and serviced and for positioning said service and fueling apparatus in respect of said vehicle, which apparatus comprises:

an extendible probe member;
a contact surface on one end of said probe member;
a pressure sensitive switch means on said contact surface;
drive means operatively connected to said probe member for extending said probe member to contact said selected location on a vehicle with said surface;
control means connected to said drive means and said switch means to actuate said drive means;
transducer means operatively connected to said probe member to produce a signal representative of the distance said probe member is extended from said datum plane;
and said service apparatus being operatively connected to said transducer means, said service apparatus being responsive to a signal from said transducer means move the service apparatus toward and away from the selected location on a vehicle and second drive means connected to the service apparatus for moving the service apparatus.

2. The apparatus of claim 1 wherein said transducer means is an electromagnetic transducer providing an electrical signal representative of the distance said probe member is extended from said datum plane.

3. The apparatus of claim 1 further including second transducer means operatively connected to said service apparatus for providing a second signal representative of the distance from said service apparatus to said datum plane.

4. The apparatus of claim 3 further including signal generator means operatively connected to said first-named transducer and said second transducer and supplying a constant intensity signal.

5. The apparatus of claim 4 wherein each of said transducers and said signal generator produce an electrical output signal and further including transformer means for receiving each of said signals, said transformer means being connected to said second drive means to supply thereto an output signal representative of the sum of said first-named signal and said constant intensity signal versus said second signal.

6. Apparatus for determining the distance from a datum plane to a selected location on an automotive vehicle which is to be serviced and for positioning service apparatus in respect of said vehicle, which apparatus comprises:

an extendible probe member;
the contact surface on one end of said probe member;
a pressure sensitive switch means on said contact surface;
probe drive means operatively connected to said probe member for extending said probe member to contact said object and for retracting said probe member;
control means connected to said probe drive means and said switch to control the operation of said probe drive means;
probe electromagnetic transducer means operatively connected to said probe member to produce an electrical signal representative of the distance said probe member is extended from said datum plane; said service apparatus being movable vertically in respect of said vehicle and being operatively connected to said probe transducer means and responsive to a signal therefrom;
service apparatus drive means connected to said service apparatus for moving said apparatus toward and away from said vehicle;
service apparatus transducer means operatively connected to said service apparatus for providing an electrical signal representative of the distance from said service apparatus to said datum plane;
signal generator means for supplying a constant intensity electrical signal; and
transformer means operatively connected to said probe transducer, said service apparatus transducer and said signal generator means to receive electrical signals therefrom and produce a transformer output signal representative of the sum of said probe transducer signal and said constant intensity signal versus said service apparatus transducer signal, said transformer output signal being transmitted to said service apparatus drive means to control the movement of said service apparatus in respect of the selected location on said automotive vehicle.

References Cited

UNITED STATES PATENTS

| | | | |
|---|---|---|---|
| 1,296,346 | 3/1919 | Warring | 200—86 X |
| 1,311,214 | 7/1919 | Donohue | 200—86 |
| 2,443,347 | 6/1948 | Field | 318—20.810 X |
| 2,708,730 | 5/1955 | Alexander et al. | 318—20.715 X |
| 3,032,881 | 5/1962 | Fengler | 33—23 |

LAVERNE D. GEIGER, *Primary Examiner.*

E. J. EARLS, *Assistant Examiner.*

UNITED STATES PATENT OFFICE
CERTIFICATE OF CORRECTION

Patent No. 3,410,320                                  November 12, 1968

Irwin Ginsburgh et al.

It is certified that error appears in the above identified patent and that said Letters Patent are hereby corrected as shown below:

Column 4, line 47, "movement" should read -- movements --. Column 7, line 71, "1120a" should read -- 1220a --. Column 8, line 74, "means move" should read -- means to move --. Column 9, line 26, after "service" insert -- and fueling --.

Signed and sealed this 17th day of March 1970.

(SEAL)
Attest:

Edward M. Fletcher, Jr.                            WILLIAM E. SCHUYLER, JR.
Attesting Officer                                         Commissioner of Patents